United States Patent
Brinig et al.

(10) Patent No.: US 10,672,198 B2
(45) Date of Patent: Jun. 2, 2020

(54) TRIP TERMINATION DETERMINATION FOR ON-DEMAND TRANSPORT

(71) Applicant: Uber Technologies, Inc., San Francisco, CA (US)

(72) Inventors: Kevin Brinig, San Francisco, CA (US); Maksim Ioffe, San Francisco, CA (US); Brandon Layton, San Francisco, CA (US); Theodore Sumers, San Francisco, CA (US); Mohammed Waleed Kadous, San Francisco, CA (US)

(73) Assignee: Uber Technologies, Inc., San Francisco, CA (US)

( * ) Notice: Subject to any disclaimer, the term of this patent is extended or adjusted under 35 U.S.C. 154(b) by 804 days.

(21) Appl. No.: 15/182,217

(22) Filed: Jun. 14, 2016

(65) Prior Publication Data
US 2017/0358147 A1    Dec. 14, 2017

(51) Int. Cl.
*G07B 15/02* (2011.01)
*H04W 4/02* (2018.01)
*H04W 4/029* (2018.01)
*H04W 4/42* (2018.01)
*H04W 4/021* (2018.01)
*H04W 4/48* (2018.01)

(52) U.S. Cl.
CPC ............ *G07B 15/02* (2013.01); *H04W 4/027* (2013.01); *H04W 4/029* (2018.02); *H04W 4/42* (2018.02); *H04W 4/021* (2013.01); *H04W 4/48* (2018.02)

(58) Field of Classification Search
CPC ......... G07B 15/02; G06Q 50/30; H04W 4/04; H04W 4/046; H04W 4/46; H04W 4/029; H04W 4/027; H04W 4/48; H04W 4/021
See application file for complete search history.

(56) References Cited

U.S. PATENT DOCUMENTS

| | | |
|---|---|---|
| 6,195,648 B1 | 2/2001 | Simon |
| 6,263,435 B1 | 7/2001 | Dondeti |
| 8,010,285 B1 | 8/2011 | Denise |
| 8,417,448 B1 | 4/2013 | Denise |

(Continued)

FOREIGN PATENT DOCUMENTS

| | | |
|---|---|---|
| EP | 1156462 | 11/2005 |
| EP | 2767962 | 8/2014 |

(Continued)

OTHER PUBLICATIONS

Scott Grimmer,I Got Scammed by an Uber Driver and Customer Service Did What?, dated May 20, 2016, https://web.archive.org/web/20160520042933/https://milevalue.com/i-got-scammed-by-an-uber-driver-and-customer-service-did-what/ (Year: 2016).*

(Continued)

*Primary Examiner* — Rupangini Singh
(74) *Attorney, Agent, or Firm* — Mahamedi IP Law LLP

(57) ABSTRACT

In context of a transportation service provided through a transport arrangement service, examples determine a point of trip termination for a trip. The point of trip termination can be determined from passive information that is collected from a computing device of a driver. The point of trip termination can be determined based on driver input and the collected information from the driver's computing device.

13 Claims, 6 Drawing Sheets

(56) References Cited

U.S. PATENT DOCUMENTS

| | | |
|---|---|---|
| 8,417,449 B1 | 4/2013 | Denise |
| 8,538,158 B1 | 9/2013 | Denise |
| 8,670,930 B1 | 3/2014 | Denise |
| 8,718,926 B1 | 5/2014 | Denise |
| 8,915,738 B2 | 12/2014 | Mannino |
| 8,924,240 B2 | 12/2014 | Depura et al. |
| 8,934,719 B1 | 1/2015 | Denise |
| 9,097,545 B1 | 8/2015 | Denise |
| 9,898,759 B2 | 2/2018 | Khoury |
| 2008/0252412 A1 | 10/2008 | Larsson |
| 2008/0255722 A1 | 10/2008 | McClellan |
| 2009/0088924 A1 | 4/2009 | Coffee |
| 2009/0192851 A1 | 7/2009 | Bishop |
| 2009/0234552 A1 | 9/2009 | Takeda |
| 2010/0020170 A1 | 1/2010 | Higgins-Luthman |
| 2010/0136994 A1 | 6/2010 | Taylor |
| 2011/0000747 A1 | 1/2011 | Wu |
| 2011/0131154 A1* | 6/2011 | Faber .................... G01C 21/32 705/418 |
| 2011/0301806 A1 | 12/2011 | Messier |
| 2011/0301985 A1* | 12/2011 | Camp .................... G06Q 10/02 705/5 |
| 2012/0174111 A1 | 7/2012 | Pala |
| 2012/0191343 A1 | 7/2012 | Haleem |
| 2012/0232741 A1 | 9/2012 | Sekiyama |
| 2012/0232943 A1 | 9/2012 | Myr |
| 2012/0283893 A1 | 11/2012 | Lee |
| 2013/0005414 A1 | 1/2013 | Bindra et al. |
| 2013/0066688 A1 | 3/2013 | Pinkus |
| 2013/0226622 A1 | 8/2013 | Adamson |
| 2013/0311081 A1 | 11/2013 | Yamakawa |
| 2013/0345961 A1 | 12/2013 | Leader |
| 2014/0051465 A1* | 2/2014 | Ruys .................... G08G 1/202 455/457 |
| 2014/0067434 A1 | 3/2014 | Bourne et al. |
| 2014/0129951 A1 | 5/2014 | Amin et al. |
| 2014/0207342 A1 | 7/2014 | Chen et al. |
| 2014/0358376 A1 | 12/2014 | Phelan |
| 2015/0095235 A1 | 4/2015 | Dua |
| 2015/0100505 A1 | 4/2015 | Binion |
| 2015/0106900 A1 | 4/2015 | Pinski |
| 2015/0113622 A1 | 4/2015 | Dua |
| 2015/0223024 A1 | 8/2015 | Abuodeh |
| 2015/0266455 A1 | 9/2015 | Wilson |
| 2015/0279213 A1* | 10/2015 | Balter .................... G08G 1/144 705/13 |
| 2015/0302342 A1 | 10/2015 | Yeh |
| 2015/0307107 A1 | 10/2015 | Tamari |
| 2015/0348221 A1 | 12/2015 | Pedersen |
| 2016/0232719 A1 | 8/2016 | Brinig |
| 2016/0358388 A1* | 12/2016 | Skoglund .................... G06Q 50/30 |
| 2017/0039890 A1 | 2/2017 | Truong |
| 2017/0132540 A1 | 5/2017 | Haparnas |
| 2017/0358146 A1 | 12/2017 | Brinig |
| 2017/0371608 A1 | 12/2017 | Wasserman |
| 2017/0372534 A1 | 12/2017 | Steketee |
| 2018/0086347 A1 | 3/2018 | Shaikh |
| 2018/0089605 A1 | 3/2018 | Poornachandran |
| 2018/0238705 A1 | 8/2018 | O'Herlihy |
| 2019/0028444 A1 | 1/2019 | McClendon |
| 2019/0139450 A1 | 5/2019 | Truong |

FOREIGN PATENT DOCUMENTS

| | | |
|---|---|---|
| EP | 2700063 | 6/2015 |
| JP | 2014-130552 | 6/2014 |
| KR | 10-2014-0124137 | 10/2014 |
| WO | WO2012080741 A1 | 6/2012 |

OTHER PUBLICATIONS

International Search Report and Written Opinion in PCT/US2017/037421 dated Aug. 31, 2017.
IPRP in PCT/US2016/026799 dated Oct. 17, 2017.
IPRP in PCT/US2017/037421 dated Dec. 27, 2017.
Written Opinion issued in SG 11201708199T dated May 7, 2018.
IPRP in PCT/2016/016858 dated Aug. 17, 2017.
International Search Report and Written Opinion in PCT/US2016/026799 dated Jul. 28, 2016.
International Search report in PCT/US2016/016858 dated May 19, 2016.

\* cited by examiner

TRIP TERMINATION DETERMINATION FOR ON-DEMAND TRANSPORT

BACKGROUND

On-demand transportation services are technology-based services which arrange trips for a variety of purposes (e.g., user transport, package delivery) using available transport resources (e.g., vehicles of users). Such services can be technologically-centric with respect to, for example, the manner in which the services use computing devices of users for tasks such as pairing vehicles (or drivers) to transportation requests, enabling limited or controlled communications between parties or through the network service, remotely monitoring vehicles and resources in use, calculating fares and a variety of other tasks. On a group level, such services can aggregate information (e.g., position, state) from numerous users in order to determine information such as traffic congestion, supply/demand and various other facets of the service.

A service arrangement system can arrange an on-demand service, such as a transport service, to be performed by a service provider (e.g., driver) for a requesting user through the use of a mobile computing device. Typically, when the vehicles arrives at a destination (e.g., selected by the rider), the driver provides input signifying the trip has ended. The service arrangement system can use information about the route to determine the price for the transport service, and such calculation typically involves determining the location where the driver identifies as being the point of trip termination.

DETAILED DESCRIPTION

Figure 1:
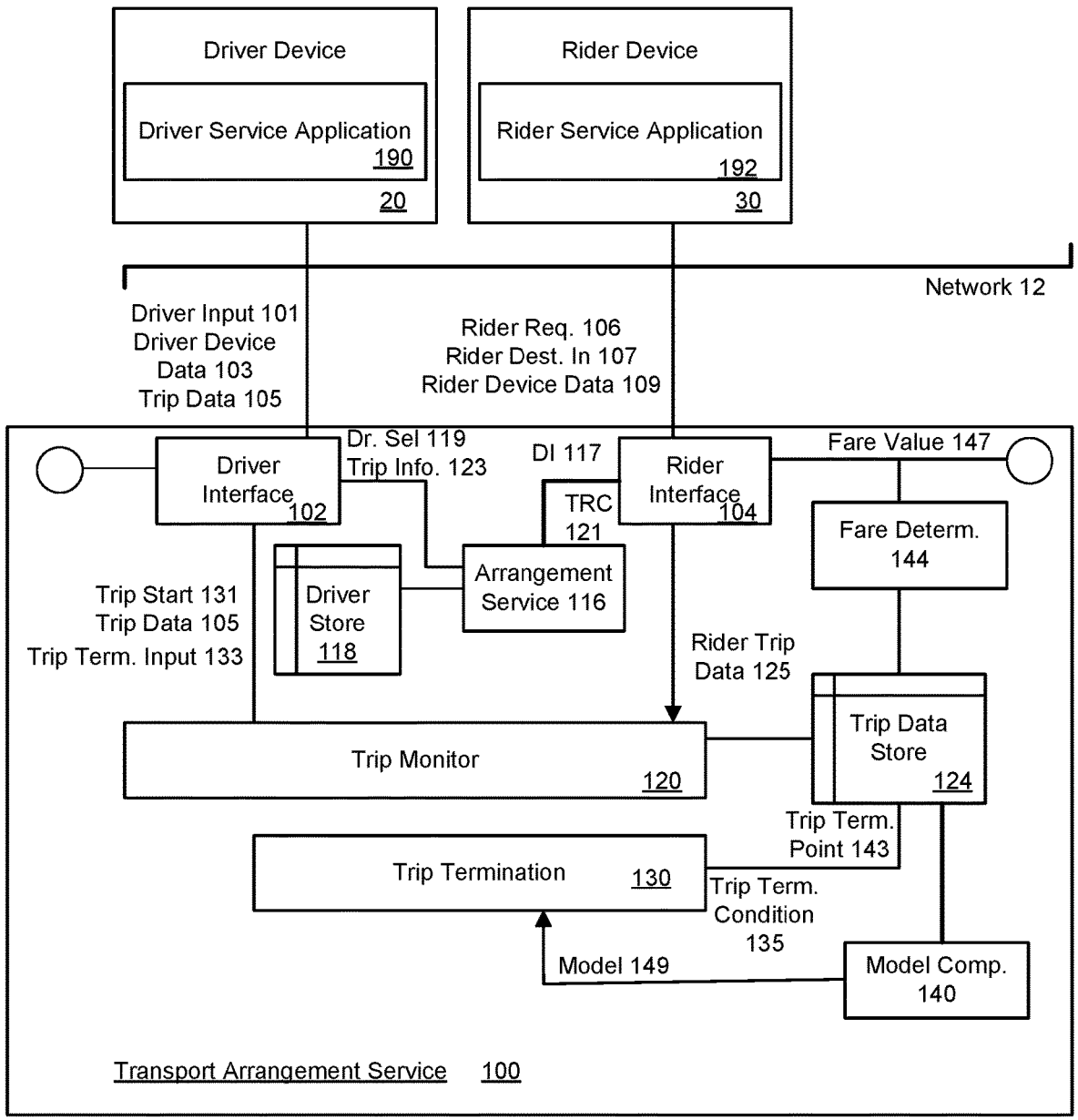
FIG. 1 illustrates an example system to programmatically a point of trip determination in connection with a transport service.

Examples includes a transport arrangement service that determines a point of termination for a trip based at least in part on passive information collected from a computing device of a driver. The passive information may include computer-generated data that is not user-initiated or generated through user intent or input. Multiple types of passive information may be collected and utilized in determining the point of termination for a trip. Examples of passive information collected from a computing device include location information (e.g., such as provided from a GPS component of a computing device), motion sensor information (e.g., such as provided by an accelerometer or gyroscope component of a computing device), environmental information (temperature, barometer, etc.) within the passenger cabin, audio input (such as recorded by the microphone of a computing device) or other types of sensor information (e.g., vehicle telemetry information such as provided through through an on-board computer of vehicle to collect On-Board Diagnostic data).

In examples described herein, the system can be implemented using a mobile computing device of a driver. In some variations, the driver's mobile computing device can execute a service application (e.g., "app" which the user can download), and the service application can implement operations that include (i) communicating over a network with a transport arrangement service, (ii) communicating a state of the driver (e.g., that runs on the driver device (e.g., a driver application).

As used herein, a client device, a driver device, a computing device, and/or a mobile computing device refer to devices corresponding to desktop computers, cellular devices or smartphones, personal digital assistants (PDAs), laptop computers, tablet devices, etc., that can provide network connectivity and processing resources for communicating with a remote system(s) over one or more networks, such as a service arrangement system. In one example, a driver device can also correspond to custom hardware of a vehicle, such as an in-vehicle computing device, that has network connectivity and location-determination capabilities.

Still further, examples described herein relate to a variety of location-based (and/or on-demand) services, such as a transport service, a food truck service, a delivery service, an entertainment service, etc. to be arranged between users and service providers. In other examples, a service arrangement system can be implemented by any entity that provides goods or services for purchase through the use of computing devices and network(s). For purpose of simplicity, in examples described herein, the service arrangement system can correspond to a transport arrangement system that arranges transport services to be provided for riders by drivers of vehicles.

One or more examples described herein provide that methods, techniques, and actions performed by a computing device are performed programmatically, or as a computer-implemented method. Programmatically, as used herein, means through the use of code or computer-executable instructions. These instructions can be stored in one or more memory resources of the computing device. A programmatically performed step may or may not be automatic.

One or more examples described herein can be implemented using programmatic modules, engines, or components. A programmatic module, engine, or component can include a program, a sub-routine, a portion of a program, or a software component or a hardware component capable of performing one or more stated tasks or functions. As used herein, a module or component can exist on a hardware component independently of other modules or components. Alternatively, a module or component can be a shared element or process of other modules, programs or machines.

Some examples described herein can generally require the use of computing devices, including processing and memory resources. For example, one or more examples described herein may be implemented, in whole or in part, on computing devices such as servers, desktop computers, cellular or smartphones, personal digital assistants (e.g., PDAs), laptop computers, printers, digital picture frames, network equipment (e.g., routers) and tablet devices. Memory, processing, and network resources may all be used in connection with the establishment, use, or performance of any example described herein (including with the performance of any method or with the implementation of any system).

Furthermore, one or more examples described herein may be implemented through the use of instructions that are executable by one or more processors. These instructions may be carried on a computer-readable medium. Machines shown or described with figures below provide examples of processing resources and computer-readable mediums on which instructions for implementing examples described herein can be carried and/or executed. In particular, the numerous machines shown with examples described herein include processor(s) and various forms of memory for holding data and instructions. Examples of computer-readable mediums include permanent memory storage devices, such as hard drives on personal computers or servers. Other examples of computer storage mediums include portable storage units, such as CD or DVD units, flash memory (such as carried on smartphones, multifunctional devices or tablets), and magnetic memory. Computers, terminals, network enabled devices (e.g., mobile devices, such as cell phones) are all examples of machines and devices that utilize processors, memory, and instructions stored on computer-readable mediums. Additionally, examples may be implemented in the form of computer-programs, or a computer usable carrier medium capable of carrying such a program.

System Description

FIG. 1 illustrates a transport arrangement system to programmatically determine a point of trip termination, according to one or more examples. According to some examples, a transport arrangement system 100 as shown with an example of FIG. 1 can validate and/or correct a point of trip termination as identified by a driver on a trip. The point of trip termination can correspond to a location, as defined by, for example, longitude and latitude where a trip is deemed to end. In some examples, the service 100 determines the point of trip determination using driver input and passive information collected from the vehicle. In variations such as described with an example of FIG. 2B, the service 100 can independently determine a point of trip termination without input from driver or rider.

In an example of FIG. 1, functionality for determining the point of trip termination is performed using computing resources (e.g., one or more servers) of the service 100. In variations, the functionality for determining the point of trip termination is distributed, using, for example, logical components or processes that are executed on, for example, computing devices of the driver or rider.

With further reference to FIG. 1, the transport arrangement service 100 includes a driver interface 102 a rider interface 104, a transport arrangement component 116, a trip monitor 120 and a trip termination determinator 130. The driver interface 102 includes processes for establishing separate and independent network connections with computing devices of drivers ("driver devices 20"). The driver devices 20 may communicate, via network 12, driver identification, and information about the service state of the driver. For example, the operational state of a driver can include state information that indicates whether the driver is available (or not available) to provide a transport service that is facilitated by the transport arrangement service 100.

Likewise, the rider interface 104 includes processes for establishing separate and independent network connections with competing devices of riders. The rider devices 30 may communicate, via the network 12, rider identification and information about the service state of the rider. For example, the riders may include those users of the transport arrangement service 100 who, in a given time period, are receiving transport, have requested but have not yet received transport, and/or may or otherwise are capable of requesting transport.

According to some examples, the driver devices 20 can correspond to mobile computing devices that are operated or otherwise associated with corresponding drivers. In some examples, the driver devices correspond to multifunctional wireless devices used for Web-enabled activities, cellular and/or other wireless communications, including messaging (e.g., SMS, email, instant messaging) and telephony. By way of example, the driver device can correspond to a smartphone or feature phone, or to a cellular-enabled tablet device. In some variations, the driver device 20 can be integrated with a corresponding vehicle that is assigned or otherwise associated with the driver for purpose of providing transport services. Similarly, the rider devices 30 can correspond to mobile computing devices that are operated by riders. Examples of rider devices 30 may also include multifunctional wireless devices used for Web-enabled activities, cellular and/or other wireless communications, including messaging (e.g., SMS, email, instant messaging) and telephony. In some examples, the driver device 20 and/or the rider device 30 can correspond to devices of a type that users typically carry on their persons in everyday activities, such as a cellular telephony device, tablet, or wearable electronic device.

Each of the driver and rider devices 20, 30 can operate a corresponding service application 190, 192 to enable the respective driver or rider to communicate with the service 100 via a network 12, and to utilize the service 100 in connection with providing (by driver) or receiving (by rider) transport services. Each of the service applications 190, 192 may provide the respective driver and rider device 20, 30 of the particular user class (driver or rider) with functionality to enable or facilitate the user in utilizing the service 100. For the driver, such functionality can include (i) automatically interfacing with components of the driver device 20, including hardware and software resources of the driver device 20, in order to obtain and transmit driver device data 103 (e.g., driver identification, driver location and driver service state) to the service 100; (ii) receiving transport requests or assignments based on criteria that includes the location of the driver's vehicle and/or the driver's vehicle type; (iii) receiving routing information for enabling or facilitating the driver in fulfilling a transport request or assignment; and/or (iv) communicating status of the driver or trip on which the driver is assigned.

For the rider devices 30, the service application 192 can implement functionality to (i) automatically interface with components of the rider device 30, including hardware and software resources of the rider device 30, in order to obtain and transmit rider device data 109; (ii) provide user interfaces for enabling the rider to make transport request and to specify information such as pick-up and/or drop-off locations; (iii) provide riders with status or feedback about transport requests and/or trips which the rider is on or recently received; and/or (iv) enable or provide customer services and functionality, such as enabling customers to link funds, provide rating or feedback for services received, and/or generate customer complaints. When devices 20, 30 of respective drivers and riders execute the corresponding service applications 190, 192, the devices 20, 30 may operate as extensions or information sources of the service 100.

In an example, drivers may be tracked by the service 100 via the respective driver interface 102. The service 100 may maintain an active driver data store 118 based at least in part on the driver data 103 communicated from the driver device 20. The driver data 103 can identify the driver, identify a current (or expected) location of the particular driver, and/or identify a service state of the driver. By way of example, the service state of the driver can correspond to available or not available. In other examples, the service state of the driver can correspond to available, en route to pick-up, or on trip.

In an example of FIG. 1, a given rider operates a corresponding rider device 30 in order to signal a ride request 106 via the service application 192 running on the rider device 30. The ride request 106 can specify the rider's identifier and a pick-up location for the rider's transport request. Additionally, in some examples, the rider can interact with the rider device 30 via the service application 192 in order to specify the rider destination input 107 for the ride request. For example, the rider may specify an address or interact with a map interface in order to drop a pin corresponding to the drop off location desired by the rider. The rider interface 104 can receive the ride request 106 (including the rider destination input 107), and then initiate a transport request signal 121 to the transport arrangement component 116. Among other functions, the transport arrangement component 116 can perform operations that include identifying and pairing a driver with a given rider request 106. In connection with a given rider request 106, the transport arrangement component 116 may also receive a destination input 117, corresponding to or based off of the rider destination input 107 (e.g., rider-specified drop-off location).

The transport arrangement component 116 may select a driver from the active driver data store 118, and signal driver selection 119 and trip information 123 for the transport request 106. The driver selection 119 may identify the driver. The driver interface 102 may signal the trip information 123 to the selected driver, where the trip information includes a rider identifier and a pick-up location of the trip. Additionally, the trip information 123 may include the drop-off location as specified by the rider destination input 107 the transport request 106. The service application 190 of the selected driver can disclose the trip information 123 to the driver in accordance with a protocol. For example, the destination specified by the rider may be disclosed after the trip has been initiated.

The trip may start when the rider enters the vehicle. In some examples, the trip start may be signaled by the driver providing a trip start input 131. At the end of the trip, the driver may also provide a trip termination input 133. Each of the trip start 131 and trip termination inputs 133 can be associated with a location, determined from, for example, the service application 190 interacting with the GPS component of the driver device 20. While the trip is in progress, the driver interface 102 receives trip data 105 from the driver device 20. The trip data 105 may include sensor data from the driver device 20. In one implementation, the trip data 105 can include position information, determined from the service application 190 interfacing with with a GPS device of the driver device 20. In variations, the trip data 105 can include acceleration data from the service application 190 interfacing with an accelerometer and/or gyroscope of the driver device 20. Still further, the trip data 105 can include sensor data from other sensors of the driver device 20, such as a magnetometer, camera, or microphone of the driver device 20. In other variations, the trip data 105 includes environmental sensor data, from sensor devices such as thermometers or barometers. Still further, the trip data 105 can include data which the driver device 20 acquires from an onboard computer of the vehicle (e.g., telemetry data, OBD data), or through interaction with integrated or embedded sensor devices of the vehicle.

From the driver device 20, the trip monitor 120 may receive or collect the trip start input 131, the driver trip data 105 for the trip in progress, and the trip termination input 133. In variations, the trip monitor 120 may also receive rider trip data 125 from the rider device 30, via the service application 192 communicating with the rider interface 104 of the service 100.

The trip data store 124 represents memory which holds the trip data 105, 125, as well as trip start input 131 and trip termination input 133 for determining the beginning and end of the trip. The trip data store 124 may also include rider-inputs such as the rider destination input 107 and/or the pick-up location.

The trip termination determinator 130 may monitor the trip data store 124 for a condition that signals the end of the trip. According to some examples, a trip determination condition 135 can correspond or correlate to the trip termination input 133 provided by the driver, via the service application 190. As an addition or alternative, the rider input can be used for the trip determination condition 135. Still further, the trip determination condition 135 can be determined from comparing trip data 105, 125 obtained from the respective driver and rider devices 20, 30. For example, the trip data 105, 125 obtained from the respective driver and rider devices 20, 30 can correspond to position information from each device, and the trip data store 124 may generate the trip determination condition 135 when the position information of the driver and rider is sufficiently disparate to indicate that the rider and driver or not in the same vehicle.

In some variations, the trip data 105 can include sensor data from at least one of the driver or rider computing device 20, 30, signifying the termination of the trip. In one implementation, a microphone of the driver device 20 may listen for and detect the sound of a car door closing. When the sound is heard, the driver device 20 may infer the trip is terminated, as the rider has likely left the vehicle. In such an example, the trip termination condition 135 can correspond to an audio input signal that matches to the sound of the vehicle's door opening and/or closing.

In other variations, the trip data 105 may include sensor data (e.g., from a barometer of the driver computing device 20) which detects from sensors which can detect environmental conditions such as temperature or barometric changes within the vehicle. When the car door opens and closes (presumably to allow for the rider to leave), the change in environmental conditions (e.g., barometric reading) can signify the termination of the trip. In such an example, the trip termination condition 135 can correspond to an environmental sensor reading (e.g., barometric value, temperature) which is indicative of the vehicle door opening and closing.

Once the trip termination determinator 130 determines that trip termination condition 135 is present, the trip termination determinator 130 can validate a point of the trip termination. When trip termination condition 135 is determined from, for example, driver termination input 133, the location associated with the driver termination input 133 can be used as a driver-specified point of termination. The trip termination determinator 130 can process the trip data 133 to validate (or invalidate) the point of termination. In an example of FIG. 1, the trip termination determinator 130 can validate the point of trip termination 143 and store the point of trip termination with the trip data store 124. In some examples, other components of the service 100, such as fare determination logic 144, can interface with the trip data store 124 in order to determine the fare 147 for the trip based on the validated point of trip termination 143. The fare determination component 144 can output the corresponding fare 147 (or value for fare) to the service applications 190, 192 of the corresponding driver and rider devices 20, 30, via the respective driver and rider interfaces 102, 104.

In one example, the trip data 105 is analyzed to detect whether the driver's vehicle came to a stop at or near the driver-specified point of termination (or when the driver termination input 133 is received). In one implementation, if the driver-specified point of termination is deemed equivalent to the vehicle's stopping location, then the driver-specified point of termination can be validated as the trip determination point 143.

According to various examples, the trip termination determinator 130 may be implemented with rules or other logic for validating, correcting and/or refining the driver-specified point of termination as the validated point of termination 143. According to some examples, the trip termination determinator 130 responds to trip termination condition 135 by determining whether the driver's vehicle stopped within a set duration of time from the location that correlates to the driver termination input 133. In one implementation, if the vehicle is determined to have stopped in that set duration of time, then the location where the vehicle was determined to have stopped can be assumed as the point of termination 143 if that location is different from the location correlating to the driver termination input 133.

In variations, the trip termination determinator 130 can receive the rider destination input 107. The point of trip termination 143 can correspond to the location where the vehicle stopped closest to the rider destination input 107. In other examples, the trip termination determinator 130 can determine the point of trip termination 143 to correspond to the location where the vehicle stopped immediately after a location of the rider destination input 107.

In some examples, a model determination component 140 may interface with the trip data store 124 to determine training data corresponding to correlations between (i) a location corresponding to where the driver indicated the trip to have terminated, or alternatively, where sensor information from the driver or rider computing device 20, 30 indicates that the trip has terminated; (ii) the destination, based on the rider destination input; and/or (iii) the point of termination, as determined programmatically from, for example, validating, correcting or refining the termination point indicated by the driver termination input 133. An output of the model determination component 140 can be a model 149 which can be implemented by the trip termination determinator 130 to determine a model candidate point of termination 143 based on trip data 105, driver termination input 133 and/or rider destination input 107. In determining or training the model 149, the model determination component 140 may also receive input from the rider and/or driver regarding the model candidate point of termination 143 so that the model is supervised when trained. The model 149 can be based on data from a specific driver, a group of drivers which share a particular set of characteristics (drivers in a particular geographic region) or trips which share a particular set of characteristics.

In some variations, the model determination component 140 generates the model 149 to identify the point of trip termination using sensor input detected from the driver computing device 20, signifying the departure of the rider (e.g., door opens and closers, barometric reading within vehicle changes) and trip data 105. Thus, in such variations, no input may be needed from the driver when determining when the trip ends.

Methodology

Figure 2A:
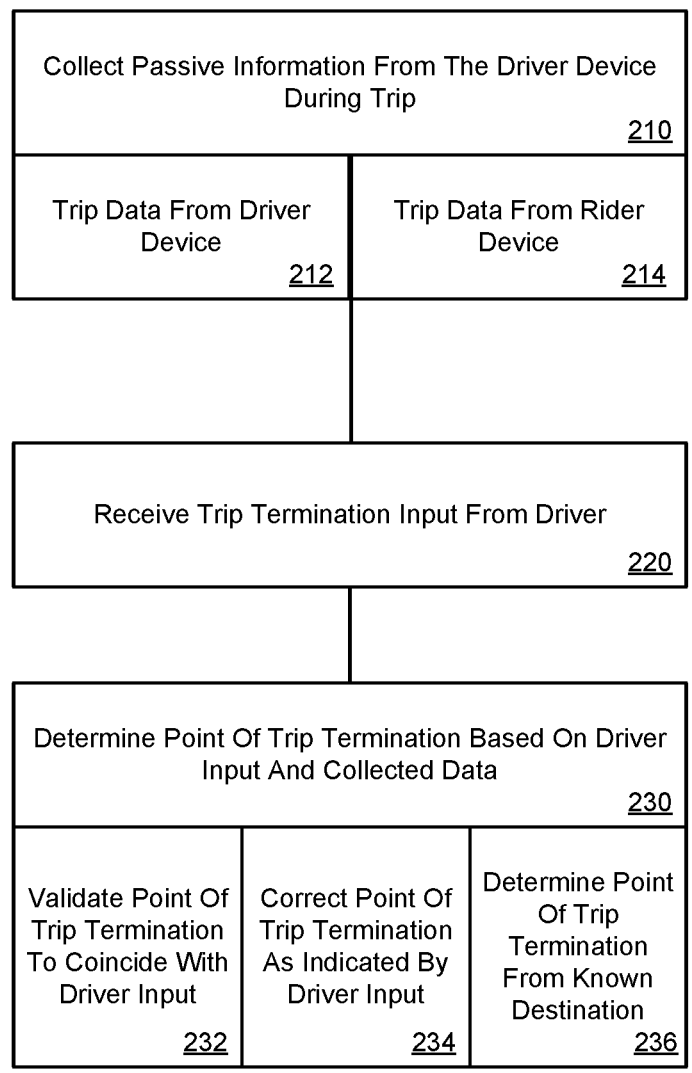
FIG. 2A illustrates an example method for programmatically determining a point of trip termination in connection with a trip arranged through a transport service.
Figure 2B:
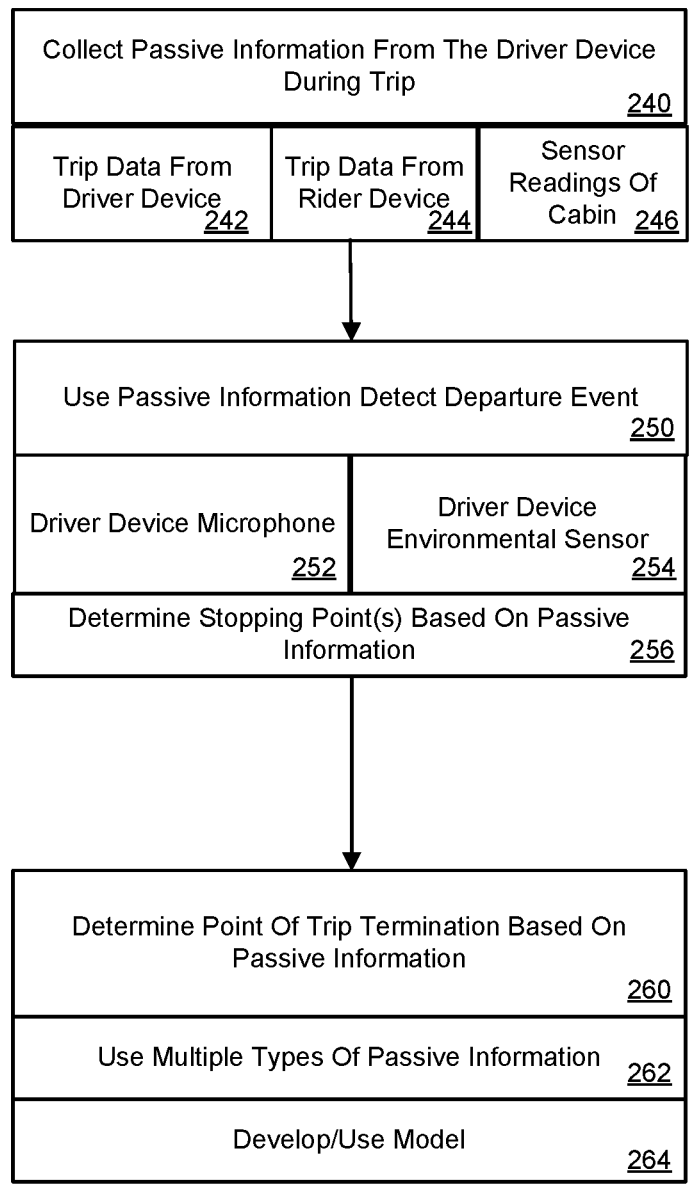
FIG. 2B illustrates another example method for programmatically determining a point of trip termination in connection with a trip arranged through a transport service.
Figure 3:
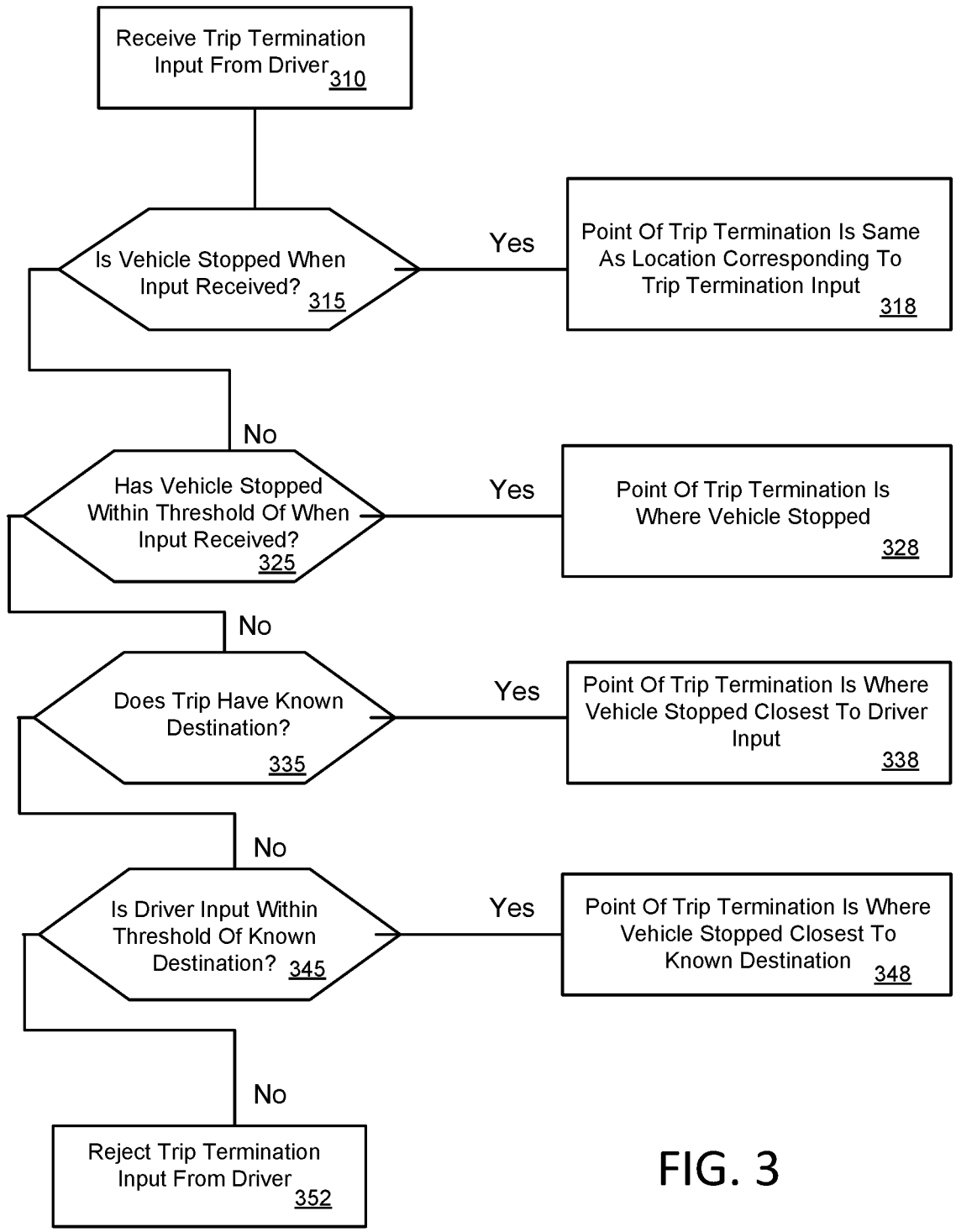
FIG. 3 illustrates another example method for programmatically determining a point of trip termination in connection with a trip arranged through a transport service.

FIGS. 2A, 2B and 3 illustrate example methods for programmatically determining points of trip termination in connection with trips arranged through a transport service. Methods such as described by examples of FIGS. 2A, 2B and 3 can be implemented using, for example, components described with an example of FIG. 1. Accordingly, references made to elements of FIG. 1 are for purposes of illustrating a suitable element or component for performing a step or sub-step being described. For purpose of simplicity, the example methods of FIGS. 2A, 2B and 3 are described as being performed by the service 100, operating in conjunction with data received from a driver device.

With reference to FIG. 2A, the service 100 operates to collect passive information from the driver device 20 (210). The passive information includes data generated from the driver device 20 (212) that is not user initiated or generated through user intent or input. Rather, the passive information can include clock signals, GPS position information, and other sensor data generated from the driver device 20 (e.g., data from reading accelerometer or gyroscope, microphone input, camera input, etc.) in connection with a trip. In an example of FIG. 1, the trip data 105 can include passive information collected from the driver device 20. In some variations, passive information may also include data generated from the rider device 30 (214). For example, the passive information may include some or all of the passive information collected from the driver device 20.

According to some examples, the service 100 may receive input from the driver signaling the trip has terminated (220). In an example of FIG. 1, the driver may provide trip termination input 133, and the trip termination input 133 can be correlated to a particular location (e.g., using the GPS device of the driver device 20).

The service 100 may operate to determine the point of trip termination based on the driver input and the passive information collected from the driver device 20 (230). For example, the passive information may include trip data 105 from the driver device 20, including GPS data, accelerometer and/or gyroscope data and/or microphone data. Some or all of the same information may be collected as part of the trip data 125 for the rider device 30. The trip data 105, 125, along with the driver termination input 133 can be used to determine (or approximate) the point of trip termination for the particular trip.

According to some examples, the trip data 105, 125 is used to validate the point of termination, which may initially correspond to the location corresponding to where the trip termination input 133 was signaled (232). In one implementation, the location of the trip termination input 133 is identified as the point of trip termination if that location is approximately the location of the where the vehicle came to a stop, as determined from the trip data 105.

In some variations, the trip data 105, 125 is used to correct the point of termination, as initially determined by the location corresponding to the termination input 133 (234). In one scenario, the driver may signal the trip termination input 133 too soon, when, for example, the vehicle is in motion and/or a distance from the destination as identified from the rider destination input 107. When the trip termination input is signaled too soon, the service 100 can extend the trip to, for example, the first location after the trip termination input 133 when the vehicle stops, or the location where the vehicle stops which is closest to the rider destination input 107.

In another scenario, the driver may signal the trip termination input 133 too late (e.g., the driver forgets to stop the trip). For example, the vehicle may be in motion when the trip termination input 133 is received from the driver. The trip data 105 may be analyzed to determine when the vehicle was most recently stopped relative to the location of the vehicle corresponding to the trip termination input 133. If the vehicle was stopped before the location corresponding to the trip termination input 131, the service 100 may shorten the trip based on an assumption that the trip ended when the vehicle stopped preceding receipt of the trip termination input 131 from the driver.

The trip termination input 131 may also be deemed too late if the trip termination input 131 is received after the vehicle passes the drop-off location, as identified by the rider destination input 107. As described with other examples, the trip data 105 may be analyzed to determine the closest location closest where the vehicle is determined to have stopped as compared to the drop-off location specified by the rider destination input 107.

According to another variation, a vehicle stopping location, as determined from the trip data 105, may be used as the point of termination in place of the location indicated by the driver's termination input 133 (236). For example, the location corresponding the trip termination input 133 may be compared to the closest location where the trip data 105 indicates the vehicle may have stopped to end the trip. If the distance exceeds a threshold, the location where the vehicle is indicated to have stopped may replace the location corresponding to the trip termination input 133 as the point of termination for the trip.

In some examples, the driver device 20 may be configured to continuously ping for the rider device (once the ride has initiated) such that when the rider exits the vehicle, the loss of proximity by the rider device is instantly detected. As an addition or alternative, the driver device 20 can utilize a microphone to detect when the vehicle's car door opens and closes. Still further, the driver computing device 20 may include sensor devices for detecting changes in environmental conditions, such may be present when car doors open and close These scenarios provide examples of when the driver device 20 may operate to automatically determine the trip had ended, without any affirmative input from the driver or rider. In such cases, the trip termination determinator 130 can utilize trip data 105 (e.g., position data, velocity 0 and implement logic to validate or correct automated determinations of trip terminations using sensor data that identifies when the rider has left the vehicle.

While an example of FIG. 2A provides for use of passive data in conjunction with driver transport termination input, in variations, the driver or rider computing device can automate detection of when a given trip ends. As described, an example of FIG. 2B may be implemented to determine the point of trip determination with accuracy and without input from the driver.

The service 100 collects passive information from computing devices that are within the vehicle during the trip (240). In one implementation, this includes a computing device of the driver which communicates trip data 105 (242). As an addition or variation, the computing device can be that of the rider (244). In a variation shown by FIG. 2B, the passive information may include GPS data and/or motion information (e.g., accelerometer readings), as well as sensor readings from the cabin of the vehicle (246). For example, the passive information may include audio input, corresponding to sounds recorded by a microphone of the driver device 20 of the vehicle's cabin. As an addition or variation, the passive information may include sensor data for the cabin of the vehicle (e.g., barometric information, temperature).

In an example of FIG. 2B, the service 100 detects, from the passive information, a departure event that is indicative of the rider leaving the vehicle (250). The detection may be of an event that is caused by a vehicle door, or more specifically, a backseat door and/or passenger-side door, being opened. In one implementation, the determination is based on a microphone within the vehicle detecting an audio signal that is a match to an indicator of the user leaving the vehicle (252). For example, the audio signal may match to the sound of the vehicle's door opening and closing, and/or the rider and driver saying goodbye to one another. The microphone within the vehicle may be provided by the driver device 20. In variations, the microphone may be provided by the rider device 30, or through another computing device or device (e.g., vehicle computer).

In a variation, the determination is based on the environmental sensor of the driver device 20 detecting a change in an environmental condition or characteristic of the vehicle which is indicative of the vehicle door opening and closing (254). For example, the driver device 20 may include a barometric sensor that detects when the barometric pressure of the cabin drops. In a variation, the driver device 20 may include a thermometer that detects a temperature change in the cabin, which in turn can be correlated to exposure by the cabin of outside air. Depending on the implementation, the environmental sensor may be provided with the driver device 20, the rider device 30, and/or other sensor device (or computing device) that is integrated or carried within the vehicle.

In some variations, the service 100 collects passive information to determine one or more stopping points of the vehicle during the trip (256). In one implementation, the position information is collected for the vehicle over the course of the trip, and then used to approximate the velocity of the vehicle and/or instances when the vehicle may have stopped.

The point of trip determination can be determined based on the passive information (260). In some implementations, the service 100 can determine the point of trip determination without receiving or otherwise using input from the driver (e.g., without receiving trip termination input 133). In one implementation, the passive information includes sensor data that detects a door of the vehicle opening and closing. For example, a microphone of the rider device 20 can detect the sound of the vehicle door opening and closing. Alternatively, an environmental sensor of the driver device 30 can detect a change in the environmental conditions of the cabin, coinciding with the vehicle door opening and closing (e.g., change in barometric reading or cabin temperature). In variations, the microphone of the driver device 20 may detect other sounds which are indicators of trip termination, either to mark the point of trip termination or confirm the point of trip termination in combination with other data.

In some variations, determination of the trip termination point is based on multiple types of passive information and/or determinations (262). In one implementation, the collected passive information includes position information (e.g., from a GPS component of the rider device 20 and/or vehicle) and/or motion data (e.g., from accelerometer included with vehicle, telemetry data from on-board computing device of vehicle, etc.). The position information and/or motion data may be used to detect when the vehicle may have stopped. For example, the point of trip termination may be deemed to be the location where the departure event is detected, provided that a separately determined vehicle stopping point (such as determined through analysis of GPS data) verifies the location of the departure event (e.g., stopping point and location of departure point or approximately same position or within threshold). As an addition or variation, the point of trip termination may be deemed to be the stopping point if the stopping point and the location of the departure event are deemed to be different (e.g., stopping point and location of departure point are different by more than a predetermined threshold).

In some variations, a model is implemented to determine the point of trip termination (264). The model can incorporate information of different types in order to approximate with accuracy the point of trip termination. In some examples, the model can be based on (i) passive information that identifies a departure event, (ii) passive information that identifies a stopping location of the vehicle, and/or (iii) rider destination input 107. The model may be trained using data collected from monitoring vehicles of a given geographic region, and/or specific drivers.

As described, an example of FIG. 2B extends to a scenario in which the driver provides no trip termination input 133. For example, the driver may begin to look for a stopping space for the vehicle when he arrives at the approximate location of the drop-off location. Once stopped, the rider disembarks, at which time passive information from the driver device 20, or the combination of the driver device 20 and rider device 30 detect the rider has left the vehicle. Thus, the point of trip termination, coinciding with the actual stopping point where the rider leaves the vehicle (the point of trip termination), may be before or after an address provided by the rider as the destination input. In an example of FIG. 2B, the driver does not provide affirmative input about the point of trip termination. Rather, the service 100 automatically deduces the point of trip termination from one or more types of passive information.

With respect to examples such as described with FIG. 2A and FIG. 2B, the service 100 may collect passive information from the vehicle, and perform operations of methods such as described using resources of the service. Thus, the point of trip termination is determined remotely, in a manner that precludes (or hinders) the ability of driver or rider to influence the determination. This allows for a more accurate and reliable mechanism for determining points of trip termination.

While some examples provide for service 100 to perform methods and operations such as described with FIG. 2A and FIG. 2B, in variations, the driver and/or rider computing device 20, 30 can perform some or all operations for determining the point of trip termination. For example, the service application 190 of the driver device 20 may be used to perform one or more operations described with FIG. 2A and FIG. 2B, using background processes and/or programmatic functionality that is inaccessible to the driver (so that the driver cannot influence the determinations).

With reference to FIG. 3, the service 100 receives the trip termination input 133 from the driver (310). A determination is made as to whether the driver's vehicle is stationary when trip termination input 133 is received (315). If the driver's vehicle is determined to be stationary when the trip termination input 133 is received, then the service 100 determines that trip termination has occurred (318), and the location corresponding to the trip termination input 133 is deemed to be the point of trip termination.

If, however, the vehicle is not stopped or stationary when the trip termination input 133 is received, then a determination is made as to whether the vehicle has stopped in a given threshold of time or distance (e.g., within the last minute, or within a 500 feet) (325). If the determination is that the vehicle has been stationary within the given threshold, then the point of trip termination is set to be the location where the trip data 105 indicates the vehicle stopped (328).

If the determination of (325) is that the vehicle has not stopped within the given threshold, then a determination is made as to whether the particular trip has a known destination (e.g., such as provided by the rider destination input 107) (335). If no known destination exists for the trip, then the point of trip termination is the location closest to the location of the trip termination input 133 where the vehicle stopped (338).

If the determination of (335) is that the trip has a known destination, then a determination is made as to whether location of the trip termination input 131 is within a designated threshold from the known location (345). If the vehicle is within the threshold, then the point of trip termination is set to be the known destination (e.g., destination identified by rider destination input 107) (348). Else, the service 100 may reject the driver's trip termination input 131, and the driver may be required to resubmit the trip termination input (352).

Hardware Diagrams

Figure 4:
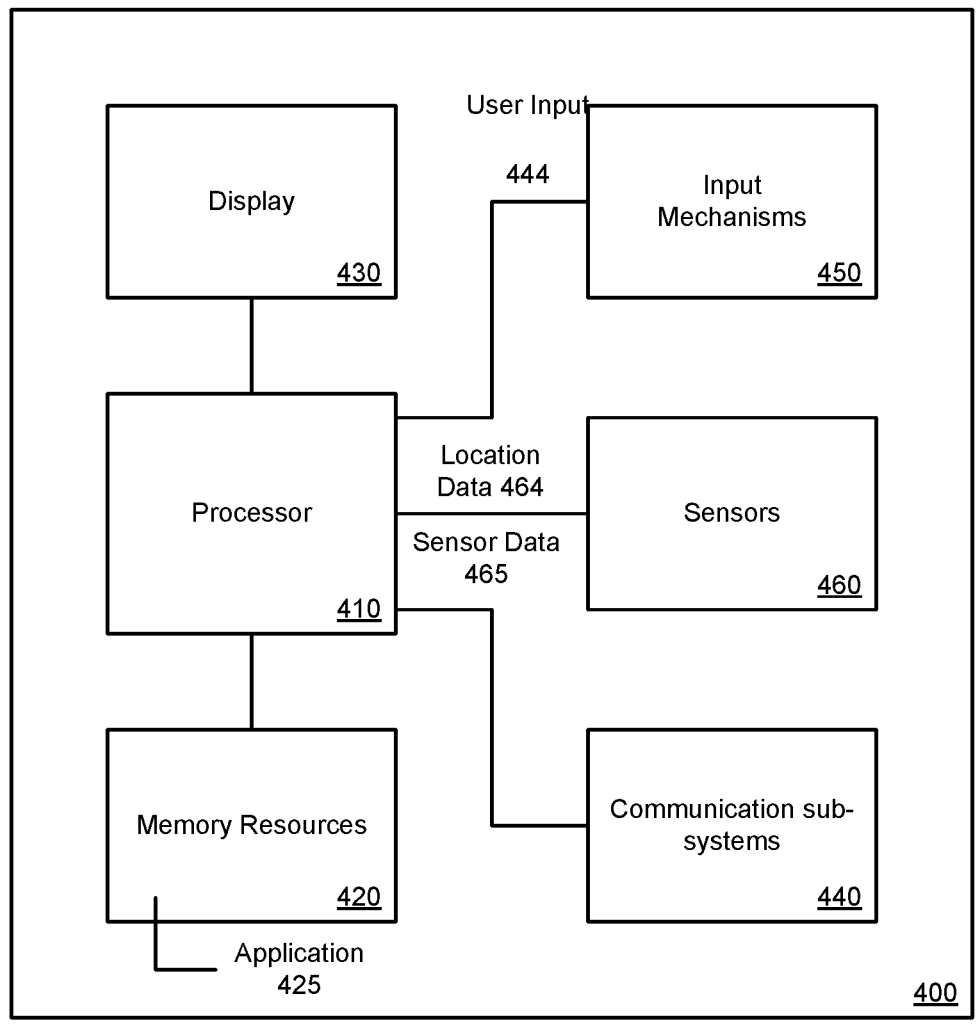
FIG. 4 is a block diagram that illustrates a mobile computing device upon which embodiments described herein may be implemented.

FIG. 4 is a block diagram that illustrates a mobile computing device upon which embodiments described herein may be implemented. In one example, a computing device 400 may correspond to a mobile computing device, such as a cellular device that is capable of telephony, messaging, and data services. The computing device 400 can correspond to, for example, driver device 20 or rider device 30. By way of example, the computing device 400 may correspond to a smartphone, handsets, wearable computing devices, or tablet devices which are wirelessly enabled (e.g., capable of cellular transmissions). The computing device 400 includes a processor 410, memory resources 420, a display device 430 (e.g., such as a touch-sensitive display device), one or more communication sub-systems 440 (including wireless communication sub-systems), input mechanisms 450 (e.g., an input mechanism can include or be part of the touch-sensitive display device), and one or more sensors 460, including a location detection mechanism (e.g., GPS receiver). In one example, at least one of the communication sub-systems 440 sends and receives cellular data over data channels and voice channels. The communications sub-systems 440 can include a cellular transceiver and one or more short-range wireless transceivers.

The processor 410 can provide a variety of content to the display 430 by executing instructions stored in the memory resources 420. The memory resources 420 can store instructions corresponding to a driver service application 425. As described with FIG. 1 (e.g., service application 190), the driver service application 425 can enable the driver to provide transport services, and to provide input corresponding to trip termination input 131 (see FIG. 1). For example, the processor 410 can execute the service application 425 to perform one or more processes, steps, and other functions described with implementations, such as described by FIGS. 1 through 3, and elsewhere in the application. Among the processes performed, the processor 410 may execute the service application 425 to signal trip data 105 (see FIG. 1) to the service 100. In example of FIG. 4, the trip data 105 can include location data 464 (e.g., as determined from the GPS component of the mobile computing device 400) and other sensor data 465 (e.g., motion data as determined from the accelerometer of the mobile computing device).

Figure 5:
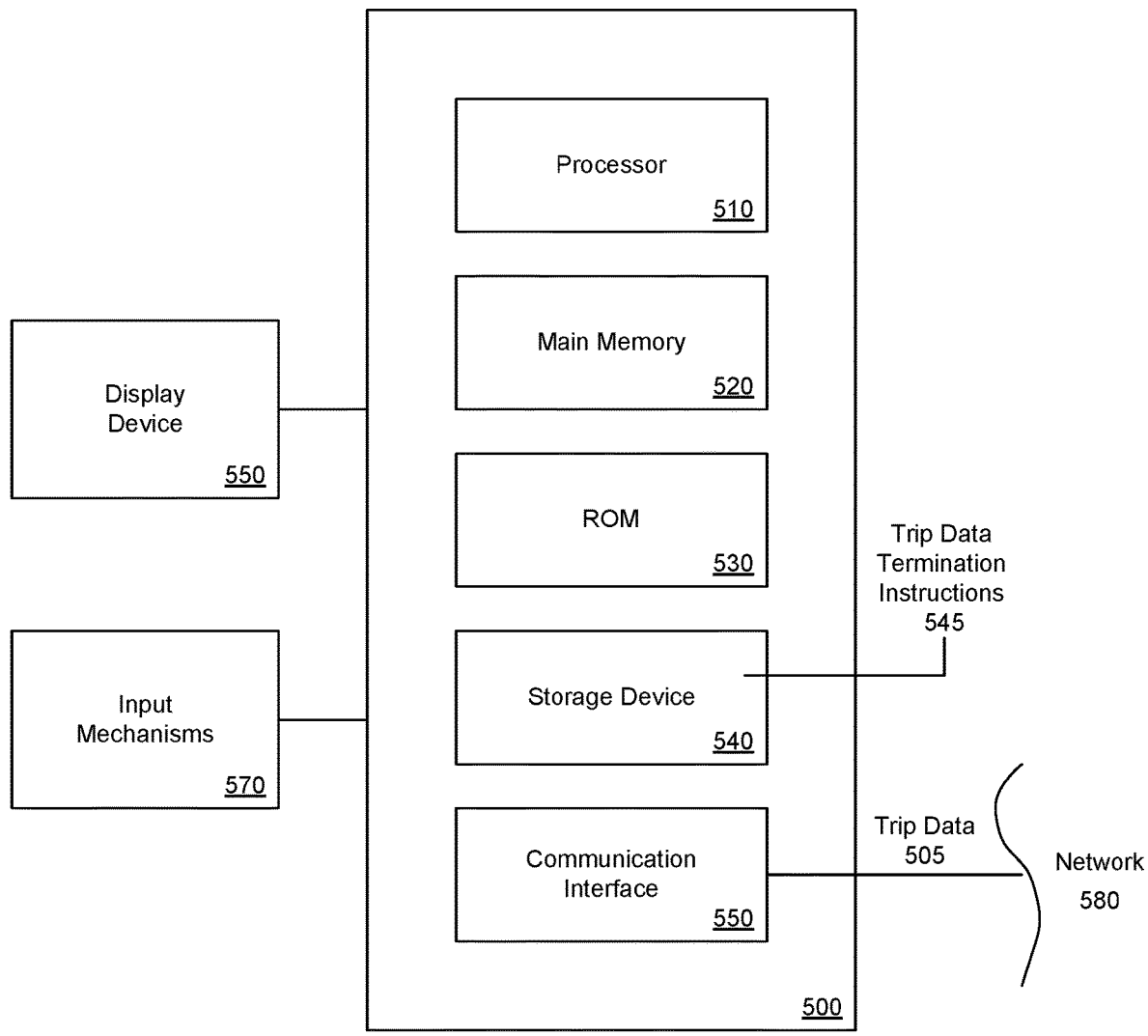
FIG. 5 is a block diagram that illustrates a computer system upon which examples described herein may be implemented.

FIG. 5 is a block diagram that illustrates a computer system upon which examples described herein may be implemented. For example, in the context of FIG. 1, the 100 may be implemented using a computer system (or combination of computer systems) such as described by FIG. 5.

In one implementation, the computer system 500 includes processing resources, such as one or more processors 510, a main memory 520, a read-only memory (ROM) 530, a storage device 540, and a communication interface 550. The computer system 500 includes at least one processor 510 for processing information and the main memory 520, such as a random access memory (RAM) or other dynamic storage device, for storing information and instructions to be executed by the processor 510. The main memory 520 also may be used for storing temporary variables or other intermediate information during execution of instructions to be executed by the processor 510. The computer system 500 may also include the ROM 530 or other static storage device for storing static information and instructions for the processor 510. The storage device 540, such as a magnetic disk or optical disk, is provided for storing information and instructions. For example, the storage device 540 can correspond to a computer-readable medium that stores trip data termination instructions 545 for determining a point of trip termination, as described by examples of FIG. 1 through 3. In such examples, the computer system 500 can determine point of trip termination from driver input (e.g., trip termination input 131 from the driver) and passively collected data from the driver's device (e.g., trip data 105).

The communication interface 550 can enable the computer system 500 to communicate with one or more networks 580 (e.g., cellular network) through use of the network link (wirelessly or using a wire). Using the network link, the computer system 500 can communicate with a plurality of devices, such as the mobile computing devices of the riders and drivers (e.g., driver devices 20, rider devices 30). According to some examples, the computer system 500 can receive trip data 505 from the driver devices and use the trip data to determine the point of trip termination, such as described by some examples of FIGS. 1 through 3.

The computer system 500 can also include a display device 560, such as a cathode ray tube (CRT), an LCD monitor, or a television set, for example, for displaying graphics and information to a user. An input mechanism 570, such as a keyboard that includes alphanumeric keys and other keys, can be coupled to the computer system 500 for communicating information and command selections to the processor 510. Other non-limiting, illustrative examples of the input mechanisms 570 include a mouse, a trackball, touch-sensitive screen, or cursor direction keys for communicating direction information and command selections to the processor 610 and for controlling cursor movement on the display 560.

Examples described herein are related to the use of the computer system 500 for implementing the techniques described herein. According to one example, those techniques are performed by the computer system 500 in response to the processor 510 executing one or more sequences of one or more instructions contained in the main memory 520. Such instructions may be read into the main memory 520 from another machine-readable medium, such as the storage device 540. Execution of the sequences of instructions contained in the main memory 520 causes the processor 510 to perform the process steps described herein. In alternative implementations, hard-wired circuitry may be used in place of or in combination with software instructions to implement examples described herein. Thus, the examples described are not limited to any specific combination of hardware circuitry and software.

It is contemplated for examples described herein to extend to individual elements and concepts described herein, independently of other concepts, ideas or system, as well as for examples to include combinations of elements recited anywhere in this application. Although examples are described in detail herein with reference to the accompanying drawings, it is to be understood that the concepts are not limited to those precise examples. Accordingly, it is intended that the scope of the concepts be defined by the following claims and their equivalents. Furthermore, it is contemplated that a particular feature described either individually or as part of an example can be combined with other individually described features, or parts of other examples, even if the other features and examples make no mentioned of the particular feature. Thus, the absence of describing combinations should not preclude having rights to such combinations.

What is being claimed is:

1. A method of implementing a transport service, the method being performed by one or more processors and comprising:

communicating, over one or more networks, with (i) computing devices of riders of a transport service via an executing rider application, and (ii) computing devices of drivers of the transport service via an executing driver application;

receiving, over the one or more networks, first sensor data from a computing device of a driver of the transport service, the first sensor data including location data from a positioning system of the computing device of the driver;

receiving, over the one or more networks, second sensor data from a computing device of a rider being transported in a vehicle by the driver, the second sensor data includes location data from a positioning system of the computing device of the rider;

remotely monitoring a velocity of the vehicle over the course of a trip in which the driver transports the rider, based on at least one of the location data from the computing device of the driver or the location data from the computing device of the rider;

receiving, over the one or more networks, input data indicating a trip termination input from the computing device of the driver via the executing driver application, the trip termination input signaling termination of the trip by the driver at a termination location;

based at least in part on monitoring the velocity of the vehicle and in response to the trip termination input signaling termination of the trip, determining whether the termination location corresponding to the trip termination input is valid, wherein the termination location is valid when the trip termination input correlates to the vehicle being stopped; and in response to determining that the termination location is not valid, validate an actual point of trip termination based on the first sensor data and the second sensor data to determine a fare for the trip.

2. The method of claim 1, wherein validating the actual point of trip termination comprises correcting the termination location.

3. The method of claim 2, wherein correcting the termination location includes extending the trip to the actual point of trip termination.

4. The method of claim 2, wherein correcting the termination location includes shortening the trip to the actual point of trip termination.

5. The method of claim 1, wherein the first sensor data further comprises acceleration data from one or more motion sensing components of the computing device of the driver.

6. The method of claim 1, wherein determining that the termination location is not valid comprises determining, based on at least one of the first sensor data or the second sensor data, the velocity of the vehicle of the driver when the driver provides the trip termination input.

7. A non-transitory computer readable medium storing instructions for determining a point of trip termination for a trip provided by a transport service, the instructions being executable by one or more processors of a computing system for a transport arrangement service to:
communicate, over one or more networks, with fi) computing devices of riders of a transport service via an executing rider application, and (ii) computing devices of drivers of the transport service via an executing driver application;
receive, over the one or more networks, first sensor data from a computing device of a driver of the transport service, the first sensor data including location data from a positioning system of the computing device of the driver;
receive, over the one or more networks, second sensor data from a computing device of a rider being transported in a vehicle by the driver, the second sensor data includes location data from a positioning system of the computing device of the rider;
remotely monitoring a velocity of the vehicle over the course of a trip in which the driver transports the rider, based on at least one of the location data from the computing device of the driver or the location data from the computing device of the rider;
receive, over the one or more networks, input data indicating a trip termination input from the computing device of the driver via the executing driver application, the trip termination input signaling termination of the trip by the driver at a termination location;
based at least in part on monitoring the velocity of the vehicle and in response to the trip termination input signaling termination of the trip, determine whether the termination location corresponding to the trip termination input is valid, wherein the termination location is valid when the trip termination input correlates to the vehicle being stopped; and
in response to determining that the termination location is not valid, validate an actual point of trip termination based on the first sensor data and the second sensor data to determine a fare for the trip.

8. A computer system comprising:
a network communication interface to communicate, over one or more networks, with (i) computing devices of riders of a transport service via an executing rider application, and (ii) computing devices of drivers of the transport service via an executing driver application;
a memory storing a set of instructions;
a processor executing the set of instructions, causing the processor to:
receive, over the one or more networks, first sensor data from a computing device of a driver, the first sensor data including location data from a positioning system of the computing device of the driver;
receive, over the one or more networks, second sensor data from a computing device of a rider being transported in a vehicle by the driver, the second sensor data includes location data from a positioning system of the computing device of the rider;
remotely monitor a velocity of the vehicle over the course of a trip in which the driver transports the rider, based on at least one of the location data from the computing device of the driver or the location data from the computing device of the rider;
receive, over the one or more networks, input data indicating a trip termination input from the computing device of the driver, the trip termination input signaling termination of the trip by the driver at a termination location;
based at least in part on monitoring the velocity of the vehicle and in response to the trip termination input signaling termination of the trip, determine whether the termination location corresponding to the trip termination input is valid, wherein the termination location is valid when the trip termination input correlates to the vehicle being stopped; and
in response to determining that the termination location is not valid, validate an actual point of trip termination based on the first sensor data and the second sensor data to determine a fare for the trip.

9. The computer system of claim 8, wherein the executed instructions cause the processor to validate the actual point of trip termination by correcting the termination location.

10. The computer system of claim 9, wherein the executed instructions cause the processor to correct the termination location by extending the trip to the actual point of trip termination.

11. The computer system of claim 9, wherein the executed instructions cause the processor to correct the termination location by shortening the trip to the actual point of trip termination.

12. The computer system of claim 8, wherein the first sensor data further comprises acceleration data from one or more motion sensing components of the computing device of the driver.

13. The computer system of claim 8, wherein the executed instructions cause the processor to determine that the termination location is not valid by determining, based on at least one of the first sensor data or the second sensor data, the velocity of the vehicle of the driver when the driver provides the trip termination input.

* * * * *